Oct. 2, 1923.

J. K. CULLEN

CLAMP AND GRIP CHUCK

Filed July 23, 1920

Inventor
James K. Cullen
By A. Jay Teller
Attorney.

Oct. 2, 1923.

J. K. CULLEN 1,469,360

CLAMP AND GRIP CHUCK

Filed July 23, 1920    2 Sheets-Sheet 2

Inventor
James K. Cullen
By S. Jay Teller
Attorney.

Patented Oct. 2, 1923.

1,469,360

UNITED STATES PATENT OFFICE.

JAMES K. CULLEN, OF NEW YORK, N. Y., ASSIGNOR TO NILES-BEMENT-POND COMPANY, OF NEW YORK, N. Y., A CORPORATION OF NEW JERSEY.

CLAMP AND GRIP CHUCK.

Application filed July 23, 1920. Serial No. 398,473.

*To all whom it may concern:*

Be it known that I, JAMES K. CULLEN, a citizen of the United States, residing at New York, in the county of New York and State of New York, have invented a certain new and useful Clamp and Grip Chuck, of which the following is a specification.

This invention relates to chuck mechanisms and particularly to a combined centering and clamping chuck. In the drawings I have illustrated the invention as applied to a car wheel boring table although it will be readily understood that the use of the invention is not necessarily so limited.

In a boring mill such as illustrated in the patent to A. C. Wais, 1,296,885, a plurality of work-holding and driving jaws are mounted for radial movement on a rotary work table. Such jaws serve to first center the work and thereafter are required to drive the work in the boring operation. Since the jaws are self-tightening, through the rotation of the work table, they may ordinarily hold the work quite securely. However, in order that the work may be positively held without any slipping backward due to the reaction of the cutting tool thereon, the present invention aims to provide holding or clamping jaws in addition to the centering jaws.

It is accordingly one object of the present invention to provide a work holder having mounted thereon a plurality of radially movable jaws for centering the work and other jaws for securely clamping and holding the work during the operation of the tool thereon. Another object of the invention is to provide a work holder having separate centering jaws and clamping jaws thereon and separate power means for operating both sets of jaws. A further object of the invention is to provide a work holder having two sets of work-engaging jaws thereon, at least one set being operated jaws thereon by fluid pressure means. Still another object of the invention is to provide a combined centering and clamping jaw, the centering jaw being adapted to be mounted for radial movement on a work holder or table and the clamping jaw being mounted for movement within the centering jaw. Other and more specific objects of the invention will become apparent as the description proceeds.

Referring to the figures of the drawings.

Figure 1:
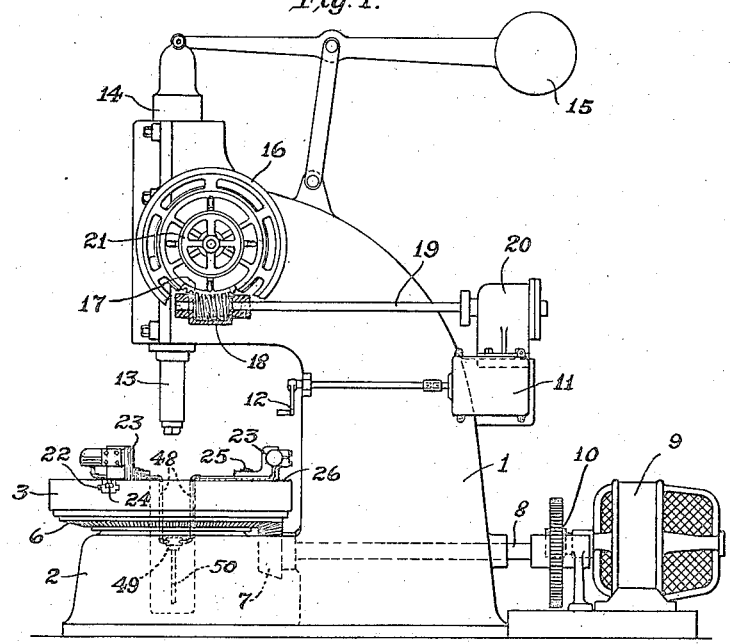
Figure 1 is a side elevation of a boring mill having the present invention applied thereto.
Figure 4:
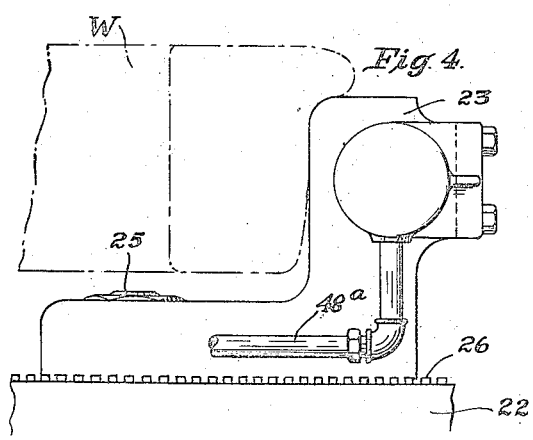
Fig. 4 is a detail side elevation of one of the combined centering and clamping jaws.

In accordance with the present invention, two sets of work-engaging jaws are provided on the work holder or table, one set being adapted to first engage and cen'er the work and the other set being adapted to thereafter engage the work in a clamping grip to hold the same during the operation of the tool thereon. As shown in the drawings the respective jaws are arranged in pairs, a clamping jaw being mounted for movement within each centering jaw, although it will be clear that any other arrangement within the broad scope of the invention may be had if desired. Preferably the two sets of jaws are operated by separate power means as will be described. The arrangement illustrated shows the centering jaws mounted for radial movement on a rotary work table such as illustrated in the above mentioned Patent 1,296,885, a clamping jaw being mounted for movement within each centering jaw.

Figure 2:
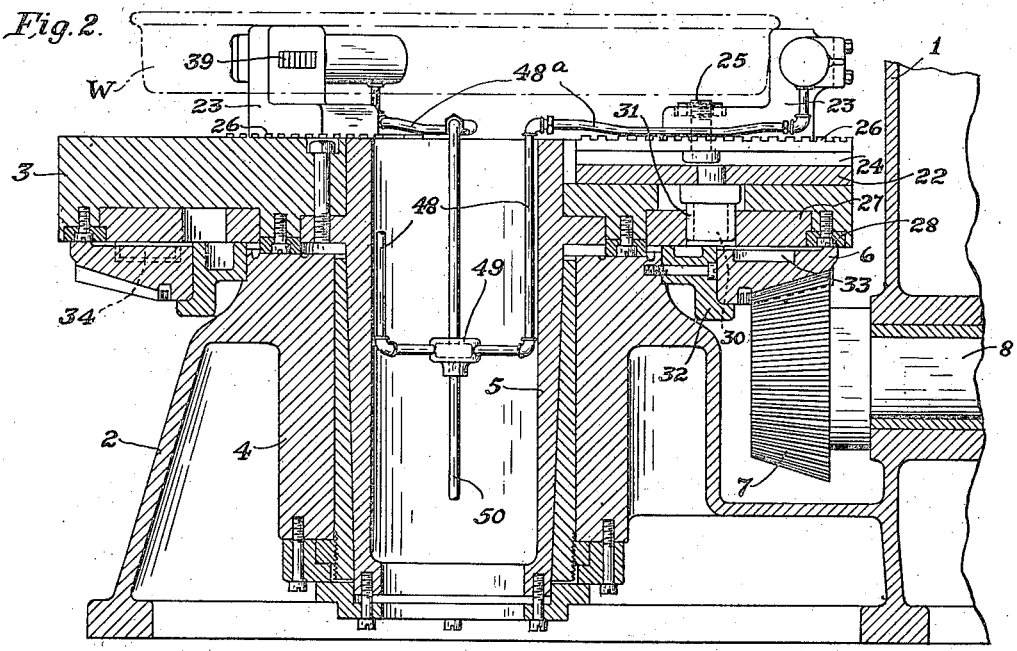
Fig. 2 is an enlarged vertical sectional view through the work table showing the work-holding elements thereon.

Referring to the drawings, 1 represents the main frame of a boring mill, this being formed with a bed 2 upon which is rotatably supported a table 3. As shown in Fig. 2, the bed is provided with a vertical bearing 4 in which rotates a hollow trunnion 5 secured to the table 3. Associated with the table 3 is a gear ring 6, the bevel teeth of which mesh with a bevel gear 7 carried by a horizontal longitudinal shaft 8. Through the shaft 8 power is supplied to rotate the table and a suitable means is provided for driving the shaft in either direction. A belt drive may be used, but preferably, as shown, the driving means comprises an electric motor 9 connected with the shaft through gearing 10. For starting, stopping and reversing the motor there is provided a controller 11 having an operating handle 12.

As shown at 13, the machine is provided with a vertical boring bar which is secured to a slide 14 vertically movable in a guideway on the upper part of the frame 1. The boring bar 13 is substantially in alinement with the axis of the table 3 and of the trunnion 5, and is adapted to carry a suitable boring tool. Preferably a counterbalance 15 is connected with the slide 14 in the way shown. For moving the slide and the boring bar vertically there is provided a suitable mechanism which includes a hand wheel 16. Preferably there is also a worm wheel 17 meshing with a worm 18 on a longitudinal shaft 19. Power means such as a change gear mechanism 20, suitably connected with the main drive, is provided for rotating the shaft 19 and thus turning the worm wheel and moving the slide and the boring bar vertically to effect feeding in direct relation to the rotation of the table. The worm wheel 17 can be either connected to or disconnected from the slide by means of a second hand wheel 21.

The table 3 is provided with a plurality of radial guideways in each of which is fitted a slide 22. Three such guideways or slots are shown in the drawings, but it will be understood that the number can be varied. Each slide 22 carries a main or centering jaw 23 and preferably the jaws are adjustable longitudinally in the slides. As shown, each slide has a T-slot 24 into which extends a bolt 25 engaging the corresponding jaw. Preferably each slide and jaw are provided respectively with intermeshing teeth 26 which serve to positively lock the jaw in position with respect to the slide when the bolt 25 is tightened.

Figure 3:
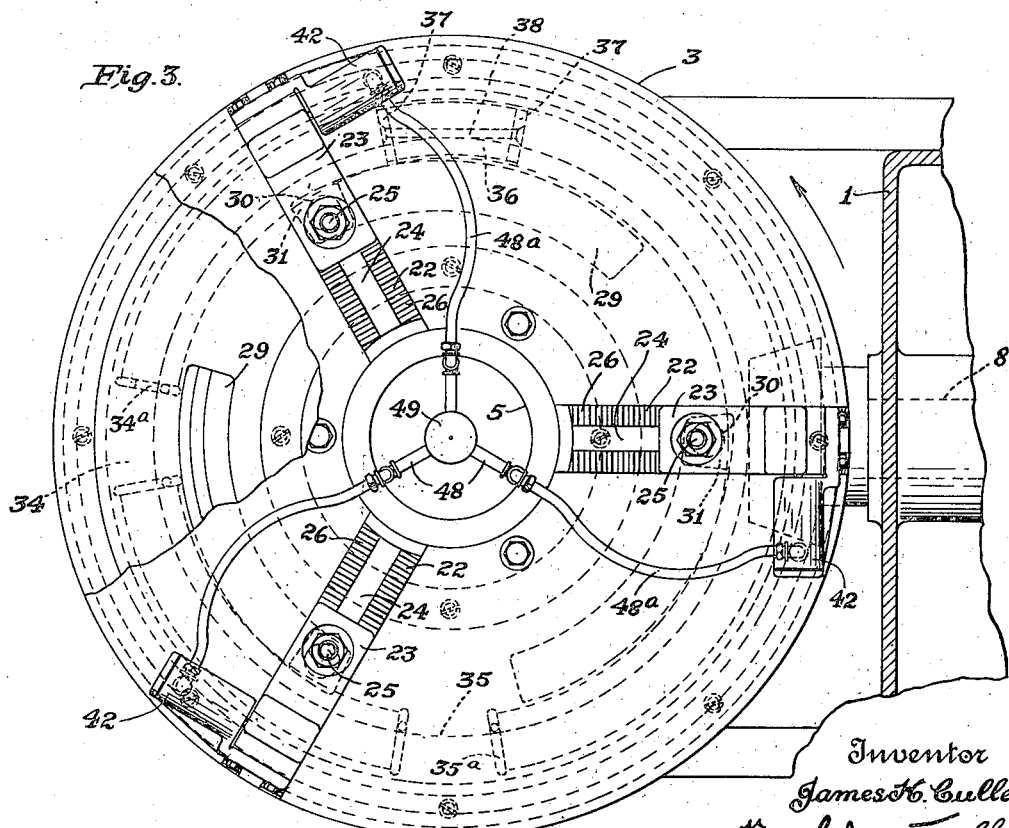
Fig. 3 is a plan view thereof.

A ring or plate 27 is mounted for rotation about the same axis as the table 3 and is capable of a limited rotative movement independent of the table movements. Preferably, as shown, the ring 27 is seated in an annular groove or channel in the bottom of the plate and is held in place by an annular clip or ring 28. Means is provided whereby rotative movement of the ring 27 with respect to the table 3 affects radial movements of the slides 22 and the jaws 23. Preferably this means is constructed as follows: The ring 27 is provided with a series of spiral slots or grooves 29 corresponding in number to the slides 22. Projecting downward from each slide and extending through a radial slot in the table is a pin 30. Fitted to each pin 30 is a shoe 31 which is adapted to fit the corresponding spiral groove 29. It will be seen that, when the ring 27 is moved with respect to the table in the direction of the arrow in Fig. 3, the several slides and jaws will be moved inward. When the ring is moved with respect to the table in the other direction, the several slides and jaws will be moved outward.

It will be understood that when the inside of a wheel rim or tire is to be gripped the direction of inclinations of the cam slots is reversed, thus reversing the directions of movements of the slides and jaws.

The aforesaid gear ring 6 is supported independently of the table 3 and of the ring 27. As shown, it is carried by a bearing ring 32 secured to the bed 2. Formed in the upper part of the gear ring 6 is an annular groove 33 in which are one or more obstructions. As shown, there are two obstructions 34 and 35 placed about 90° apart, and these are formed as integral parts of the gear ring casting. Preferably renewable plates 34$^a$ and 35$^a$ are fitted into grooves at the sides of the obstructions 34 and 35. The cam ring 27 is provided with a lug 36 which projects into the groove 33. Preferably the lug 36 carries at its opposite sides two shoes 37, 37 held in place by a pin 38 extending through the lug. This construction within itself is a part of the invention comprised in the above mentioned Patent 1,296,885 and reference to such patent should be had for a more complete disclosure thereof.

Figure 5:
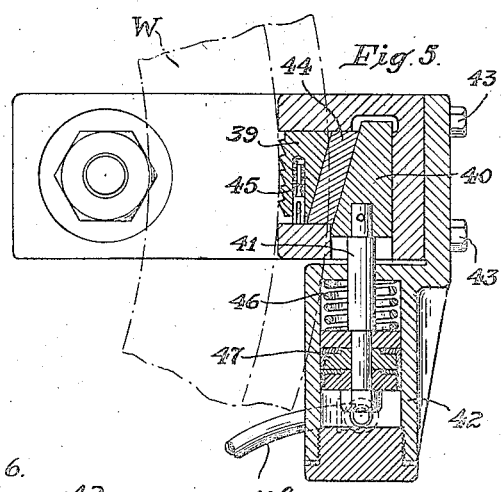
Fig. 5 is a plan view thereof, a portion being shown in horizontal section.
Figure 6:
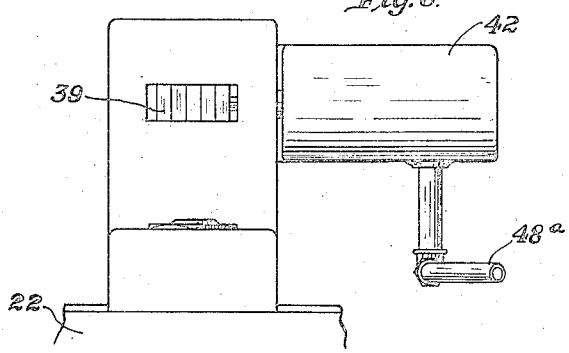
Fig. 6 is a front view thereof.

As above stated, in addition to the centering jaws I provide a plurality of clamping jaws, in the construction illustrated a serrated clamping jaw 39 being mounted for movement within each centering jaw, such construction comprising in effect a combined centering and clamping jaw. I preferably operate each clamping jaw 39 by means of a sliding wedge 40 on a piston rod 41 movable within a cylinder 42 secured to the centering jaw by means of bolts 43 or otherwise. A block 44 is interposed between each clamping jaw 39 and its operating wedge 40 and a spring and pin 45 in each clamping jaw serves to normally hold each clamping jaw at the lowermost position of the wedge. By reference to Fig. 5 it will be seen that the interposition of the block 44 between the jaw 39 and wedge 40 prevents the longitudinal sliding movement of either of the said elements from having any sliding effect upon the other element. Each wedge is normally held in a disengaged position by means of a compression spring 46 on the inside of the piston 47 and is forced to its operative position by means of fluid pressure on the opposite side of the piston, the branch fluid pressure pipes 48 from each cylinder extending within the trunnion 5 to a swivel joint 49 on the main fluid supply pipe 50. It will be noted that the horizontal portion 48$^a$ of such branch pipes are flexible thereby allowing for the radial movement of the jaws 23. The arrangement of the pipes 48 is such as to provide space for a chip bucket therebetween adapted to seat on the swivel joint 49.

In operation, the work, such as a car wheel W to be bored, is placed on the table with its axis substantially coincident with the table axis, the several jaws 23 being in proximity to the periphery of the wheel. It will be understood that the jaws can be adjusted on the slides to correspond to wheels of different diameters. Then the motor 9 is started by means of the controller 11 to drive the gear ring 6 in the direction indicated by the arrow in Fig. 3. As soon as the obstruction 35 engages the lug 36 the cam ring 27 is started in the direction of the arrow and turns relatively to the table 3. This relative turning movement serves to move all of the slides 22 and jaws 23 inward. This movement continues until the jaws 23 firmly engage the periphery of the wheel to center the same, whereupon relative movement between the ring and the table ceases and the table starts to rotate carrying the wheel with it. The work now being centered upon the table, fluid pressure is admitted to the pipe 50 and passed through the branch pipes 48 and 48$^a$ to the cylinders whereupon the wedges 40 are forced inward thereby forcing the clamping jaws 39 outward into driving engagement with the work. The rotative movement of the table and of the wheel is continued and the boring bar 13 is fed downward to bring the boring tool into engagement with the hub of the wheel. The driving pressure on the clamping jaws 39 tends to slide such jaws toward the springs 45 and, the block 44 being inclined upwardly, any movement of the jaws in such direction forces the same radially into tighter engagement with the work. The boring operation is effected in the usual way.

At the end of the boring operation the fluid pressure is cut off from the pipe 50 whereupon the springs 46 withdraw the wedges from engagement with the blocks 44 to release the clamping jaws from the work. The jaws 23 however remain engaged with the wheel and special means is provided for disengaging them. They can be disengaged by moving the cam ring relatively to the table in the direction opposite to the arrow in Fig. 3, but, because of the clamping action which has taken place, this relative movement may not be easily effected. It will be apparent from the description which has already been given that considerable lost motion is permitted between the gear ring 6 and the cam ring 27. Advantage is taken of this lost motion for applying a powerful blow to drive the ring 27 backward in the direction to release the centering jaws. At the conclusion of the turning operation and when fluid pressure has been cut off from the pipe 50, the motor 9 is started in the reverse direction by means of the controller 11, thus driving the gear ring 6 in the direction opposite to the arrow in Fig. 3. The gear ring is relatively heavy and acquires considerable momentum. Its rotation continues until the obstruction 34 engages the lug 36 on the cam ring, thus applying a blow which tends to rotate the ring backward. In many cases a single blow will be sufficient to drive the ring far enough to entirely release the jaws, but, if necessary, by reversing the motor, subsequent blows may be delivered until the jaws are released.

It will be seen that by this construction I have provided a simple chuck which automatically engages and centers the work when the table is started in the operative direction, and in combination with the centering jaws are provided preferably a like number of clamping jaws which are adapted to securely grip the work after the centering thereof by the main or centering jaws and to hold the same secured during the operation of the tool thereon. While the construction illustrated shows one embodiment of the invention it should be understood that the same is capable of various modifications within the scope of the appended claims.

What I claim is:

1. In a metal working machine, the combination of a work holder, a plurality of radially movable centering jaws on the holder, a plurality of clamping jaws on the holder movable in the same general direction for clamping the work that the centering jaws move in centering the work, the centering jaws being adapted to first engage the work to center the same and the clamping jaws being adapted to be operated thereafter to grip the work adjacent the centering jaws to drive the same, and power operated means for operating the centering and clamping jaws.

2. In a metal working machine, the combination of a work holder, a plurality of radially movable centering jaws on the holder, a plurality of clamping jaws on the holder movable in the same general direction for clamping the work that the centering jaws move in centering the work, the centering jaws being adapted to first engage the work to center the same and the clamping jaws being adapted to be operated thereafter to grip the work adjacent the centering jaws to drive the same, and power operated means including fluid pressure means for operating the centering and clamping jaws.

3. In a metal working machine, the combination of a work holder, a plurality of radially movable centering jaws on the holder, a plurality of clamping jaws on the holder movable in the same general direction for clamping the work that the centering jaws move in centering the work, the centering jaws being adapted to first engage the work to center the same and the clamping jaws being adapted to be operated thereafter to grip the work to drive the same, and separate power means for operating the centering and clamping jaws respectively.

4. In a metal working machine, the combination of a work holder, a plurality of radially movable centering jaws on the holder, a plurality of clamping jaws on the holder movable in the same general direction for clamping the work that the centering jaws move in centering the work, power means for operating the centering jaws, and means operated by other power means for operating the clamping jaws simultaneously and with equal pressure.

5. In a metal working machine, the combination of a work holder, a plurality of radially movable centering jaws on the holder, a plurality of clamping jaws on the holder, both sets of jaws being radially movable inward in clamping the work, the centering jaws being adapted to first engage the work to center the same and the clamping jaws being adapted to be operated thereafter to grip the work adjacent the centering jaws to drive the same, and power means for operating both sets of jaws.

6. In a metal working machine, the combination of a work holder, a plurality of radially movable centering jaws on the holder, a plurality of clamping jaws on the holder, both sets of jaws being radially movable inward in clamping the work, the centering jaws being adapted to first engage the work to center the same and the clamping jaws being adapted to be operated thereafter to grip the work adjacent the centering jaws to drive the same, power means for operating one set of jaws, and fluid pressure means for operating the other set of jaws.

7. In a metal working machine, the combination of a work holder, a plurality of radially movable centering jaws on the holder, a plurality of clamping jaws on the holder, both sets of jaws being radially movable inward in clamping the work, the centering jaws being adapted to first engage the work to center the same and the clamping jaws being adapted to be operated thereafter to grip the work adjacent the centering jaws to drive the same, and means operated by separate power means for operating each set of jaws respectively.

8. In a metal working machine, the combination of a work holder, a plurality of radially movable centering jaws on the holder, a plurality of clamping jaws on the holder, both sets of jaws being radially movable inward in clamping the work, the centering jaws being adapted to first engage the work to center the same and the clamping jaws being adapted to be operated thereafter to grip the work to drive the same, power means for operating the centering jaws, and means operated by other power means for operating the clamping jaws simultaneously and with equal pressure.

9. In a metal working machine, the combination of a work holder, a plurality of radially movable centering jaws on the holder, a plurality of clamping jaws on the holder movable in the same general direction for clamping the work that the centering jaws move in centering the work, mechanical power means for operating the centering jaws, and fluid pressure means for operating the clamping jaws.

10. In a metal working machine, the combination of a work holder, a plurality of radially movable centering jaws on the holder, a plurality of radially movable clamping jaws on the holder adjacent the centering jaws, the centering jaws being adapted to first engage the work to center the same and the clamping jaws being adapted to be operated thereafter to grip the work to drive the same, cam means for operating the centering jaws, and fluid pressure means for operating the clamping jaws.

11. In a metal working machine, the combination of a work holder, a plurality of radially movable centering jaws on the holder, a plurality of radially movable clamping jaws on the holder in approximately the same transverse plane as the centering jaws and movable relative thereto, and power means for operating the centering and clamping jaws, the centering jaws being adapted to first engage the work to center the same and the clamping jaws being adapted thereafter to grip the work adjacent the centering jaws to drive the same and the clamping jaws and the operating means therefor being of such construction that any rotary slipping of the work due to the reaction of the tool thereon will automatically tighten the clamping jaws on the work.

12. In a metal working machine, the combination of a work holder, a plurality of radially movable centering jaws on the holder, a plurality of radially movable clamping jaws on the holder in approximately the same transverse plane as the centering jaws, and movable relative thereto, power means for operating one set of jaws, and fluid pressure means for operating the other set of jaws, the clamping jaws and the said operating means therefor being of such construction that any slipping of the work due to the reaction of the tool thereon will automatically tighten the clamping jaws on the work.

13. In a metal working machine, the combination of a work holder, a plurality of radially movable centering jaws on the holder, a plurality of radially movable clamping jaws on the holder in approximately the same transverse plane as the centering jaws, power means for operating the centering jaws, and other power means for operating the clamping jaws, the clamping jaws and their operating means being of such construction that any rotary slipping of the work due to the reaction of the tool thereon will automatically tighten the clamping jaws on the work.

14. In a metal working machine, the combination of a work holder, a plurality of radially movable centering jaws on the holder, a plurality of radially movable clamping jaws on the holder in approximately the same transverse plane as the centering jaws, power means for operating the centering jaws, wedge means for operating the clamping jaws, and other power means for operating the said wedge means, the clamping jaws and their operating wedges being so related that any rotary slipping of the work due to the reaction of the tool thereon will automatically tighten the clamping jaws on the work.

15. In a metal working machine, the combination of a work holder, a plurality of radially movable centering jaws on the holder, a plurality of radially movable clamping jaws on the holder in approximately the same transverse plane as the centering jaws, power operated means for operating the centering jaws, a wedge for operating each clamping jaw, and fluid pressure means for operating the said wedges, the clamping jaws and their operating wedges being so related that any rotary slipping of the work due to the reaction of the tool thereon will automatically tighten the clamping jaws on the work.

16. In a metal working machine, the combination of a rotary work holder, a plurality of radially movable centering jaws on the holder, a plurality of clamping jaws on the holder means operated by the holder rotation for operating the centering jaws, power means for operating the clamping jaws, and means for rotating the holder.

17. In a metal working machine, the combination of a rotary work holder, a plurality of radially movable centering jaws on the holder, a plurality of radially movable clamping jaws on the holder, means operated by the holder rotation for operating the centering jaws, power means for operating the clamping jaws simultaneously and with equal pressure, and means for rotating the holder.

18. In a metal working machine, the combination of a rotary work holder, a plurality of radially movable centering jaws on the holder, a plurality of clamping jaws on the holder, means operated by the holder rotation for operating the centering jaws, fluid pressure means for operating the clamping jaws and means for rotating the holder.

19. In a metal working machine, the combination of a rotary work table, a plurality of radially movable centering jaws on the table, a plurality of clamping jaws on the table, means operated by the table rotation for moving the centering jaws radially, fluid pressure operated means for operating the clamping jaws, and pipes leading from the last mentioned means downwardly and inwardly to a swivel joint mounted on the main fluid pressure supply pipe at the center of table rotation, the space between the said downwardly extending pipes affording room for a chip bucket adapted to rest on the swivel joint.

20. In a metal working machine, the combination of a work holder, a plurality of radially movable centering jaws on the holder, a clamping jaw mounted in each centering jaw, and power means for moving the centering jaws radially of the holder and for moving the clamping jaws in the centering jaws.

21. In a metal working machine, the combination of a work holder, a plurality of radially movable centering jaws on the holder, a clamping jaw mounted in each centering jaw, power means for moving the centering jaws radially of the holder, and fluid pressure means for moving the clamping jaws in the centering jaws.

22. In a metal working machine, the combination of a work holder, a plurality of radially movable centering jaws on the holder, a clamping jaw mounted in each centering jaw, power means for operating the centering jaws, and other power means for moving the clamping jaws in the centering jaws.

23. In a metal working machine, the combination of a work holder, a plurality of radially movable centering jaws on the holder, a serrated clamping jaw mounted in each centering jaw, power operated means for operating the centering jaws, and fluid pressure means for moving the clamping jaws in the centering jaws.

24. In a metal working machine, the combination of a work holder, a plurality of radially movable centering jaws on the holder, a serrated clamping jaw mounted in each centering jaw, power operated means for operating the centering jaws, and fluid pressure operated wedge means for moving the clamping jaws in the centering jaws.

25. In a metal working machine, the combination of a work holder, a plurality of radially movable centering jaws on the holder, a clamping jaw mounted in each centering jaw, a fluid pressure cylinder mounted on each of the centering jaws, power operated means for operating the centering jaws, and fluid pressure operated means within each of the said cylinders for moving its respective clamping jaw within the centering jaw.

26. In a metal working machine, the combination of a work holder, a plurality of radially movable centering jaws on the holder, a clamping jaw mounted in each centering jaw, a fluid pressure cylinder mounted on each of the centering jaws, power operated means for operating the centering jaws, and means comprising a piston within each cylinder operated in one direction by fluid pressure means and in the opposite direction by spring means for controlling the movement of each clamping jaw within its centering jaw.

27. A combined centering and clamping jaw comprising the combination of a work centering element adapted to be mounted for radial movement on a work table, a clamping element mounted for limited work-engaging movement within the centering element, and fluid pressure means for moving the clamping element into engagement with the work relative to the centering element.

28. A combined centering and clamping jaw comprising the combination of a work centering element adapted to be mounted for radial movement on a work table, a serrated lineally movable clamping element mounted for limited work-engaging movement within the centering element, a wedge for moving the clamping element into engagement with the work relative to the centering element, and means for moving the wedge in the jaw.

29. A combined centering and clamping jaw comprising the combination of a work centering element adapted to be mounted for radial movement on a work table, a serrated clamping element mounted for sliding movement in two right angular directions within the centering element, a wedge for forcing the clamping element outwardly in one direction against the work, a block mounted between the clamping element and wedge, the clamping element being slidable on said block, and a spring for normally keeping the clamping element at the lower portion of the block and wedge.

30. A combined centering and clamping jaw comprising the combination of a work centering element adapted to be mounted for radial movement on a work table, a serrated lineally movable clamping element mounted for limited work-engaging movement within the centering element, wedge means for moving the clamping element into engagement with the work relative to the centering element, a fluid pressure cylinder on the centering element, and a piston within the cylinder operatively connected to the wedge means.

In testimony whereof, I hereto affix my signature.

JAMES K. CULLEN.